US007026978B2

(12) United States Patent
Okamura et al.

(10) Patent No.: US 7,026,978 B2
(45) Date of Patent: Apr. 11, 2006

(54) OBJECT DETECTOR AND OBJECT DETECTING METHOD

(75) Inventors: Shinichiro Okamura, Kyoto (JP); Tadao Nishiguchi, Kyoto (JP); Hirohisa Furukawa, Shiga (JP)

(73) Assignee: Omron Corporation, Kyoto-fu (JP)

( * ) Notice: Subject to any disclaimer, the term of this patent is extended or adjusted under 35 U.S.C. 154(b) by 0 days.

(21) Appl. No.: 10/690,499

(22) Filed: Oct. 23, 2003

(65) Prior Publication Data
US 2004/0125012 A1    Jul. 1, 2004

(30) Foreign Application Priority Data
Oct. 23, 2002    (JP)    ............................. 2002-308090

(51) Int. Cl.
*G01S 13/00*    (2006.01)

(52) U.S. Cl. .................. 342/81; 342/157; 342/158

(58) Field of Classification Search ............... 342/27, 342/28, 81, 157, 158
See application file for complete search history.

(56) References Cited

U.S. PATENT DOCUMENTS

| 4,112,419 | A | * | 9/1978 | Kinoshita et al. ............. 342/27 |
| 4,210,912 | A | * | 7/1980 | Naidich et al. ................ 342/28 |
| 4,675,678 | A | * | 6/1987 | Klingenschmitt et al. ... 342/158 |
| 5,652,589 | A | * | 7/1997 | Ono et al. ..................... 342/81 |

FOREIGN PATENT DOCUMENTS

| JP | 07-106839 | 4/1995 |
| JP | 08-105955 | 4/1996 |

* cited by examiner

*Primary Examiner*—Ian J. Lobo
(74) *Attorney, Agent, or Firm*—Dickstein Shapiro Morin & Oshinsky LLP (57) ABSTRACT

A plurality of primary detection regions A to I are scanned by switching a beam width and a beam direction of an antenna. The primary detection regions A to I are formed such that one detection region overlaps at least one of other detection regions. A small region (any one of secondary detection region (1) to (14)) corresponding to a region provided by excluding a region corresponding to a sum of set of the detection regions where a detection object was not detected, from a region corresponding to a product set of the primary detection regions where the object was detected is specified as a bearing in which the object exists, based on detection results of the respective primary detection regions.

17 Claims, 10 Drawing Sheets

| Secondary detection region | Logical operation expressions |
|---|---|
| (1) | ( Vh) & $\overline{(Va|Vb|Vc|Vd|Ve|Vf|Vg\quad\quad Vi)}$ |
| (2) | ( Ve& Vh) & $\overline{(Va|Vb|Vc|Vd\quad Vf|Vg\quad Vi)}$ |
| (3) | (Vb&Ve& Vh) & $\overline{(Va\quad Vc|Vd\quad Vf|Vg\quad Vi)}$ |
| (4) | (Vb&Ve&Vg&Vh) & $\overline{(Va\quad Vc|Vd\quad Vf\quad\quad Vi)}$ |
| (5) | ( Ve&Vg&Vh) & $\overline{(Va|Vb|Vc|Vd\quad Vf\quad\quad Vi)}$ |
| (6) | ( Vd&Vg&Vh) & $\overline{(Va|Vb|Vc\quad Ve|Vf\quad\quad Vi)}$ |
| (7) | (Va&Vd&Vg&Vh) & $\overline{(\quad Vb|Vc\quad Ve|Vf\quad\quad Vi)}$ |
| (8) | (Va&Vd&Vg&Vi) & $\overline{(\quad Vb|Vc\quad Ve|Vf\quad Vh\quad)}$ |
| (9) | ( Vd&Vg&Vi) & $\overline{(Va|Vb|Vc\quad Ve|Vf\quad Vh\quad)}$ |
| (10) | ( Vf&Vg&Vi) & $\overline{(Va|Vb|Vc|Vd|Ve\quad\quad Vh\quad)}$ |
| (11) | (Vc&Vf&Vg&Vi) & $\overline{(Va|Vb\quad Vd|Ve\quad\quad Vh\quad)}$ |
| (12) | (Vc&Vf& Vi) & $\overline{(Va|Vb\quad Vd|Ve\quad Vg|Vh\quad)}$ |
| (13) | ( Vf& Vi) & $\overline{(Va|Vb|Vc|Vd|Ve\quad Vg|Vh\quad)}$ |
| (14) | ( Vi) & $\overline{(Va|Vb|Vc|Vd|Ve|Vf|Vg|Vh\quad)}$ |

Fig. 4B

| Secondary detection region | Logical operation expressions |
|---|---|
| (1) | (Vh ) & $\overline{(Ve|Vg)}$ |
| (2) | (Ve ) & $\overline{(Vb|Vg)}$ |
| (3) | (Vb ) & $\overline{(Vg\quad)}$ |
| (4) | (Vb&Vg) |
| (5) | (Ve&Vg) & $\overline{(Vb\quad)}$ |
| (6) | (Vd ) & $\overline{(Va|Vi)}$ |
| (7) | (Va ) & $\overline{(Vi\quad)}$ |
| (8) | (Va ) & $\overline{(Vh\quad)}$ |
| (9) | (Vd ) & $\overline{(Va|Vh)}$ |
| (10) | (Vf&Vg) & $\overline{(Vc\quad)}$ |
| (11) | (Vc&Vg) |
| (12) | (Vc ) & $\overline{(Vg\quad)}$ |
| (13) | (Vf ) & $\overline{(Vc|Vg)}$ |
| (14) | (Vi ) & $\overline{(Vf|Vg)}$ |

PRIOR ART

OBJECT DETECTOR AND OBJECT DETECTING METHOD

BACKGROUND OF THE INVENTION

1. Field of the Invention

The present invention relates to effective technique for an object detector using a phased array antenna or the like.

2. Description of the Prior Art

Technique for detecting an object by irradiating an electric wave to predetermined regions and analyzing an echo reflected by an object existing in the detection region is well known. Such remote sensing technique using the electric wave is applied to an object detector such as a detector of an intruder for security or a car detector for a vehicle, for example.

Figure 10:
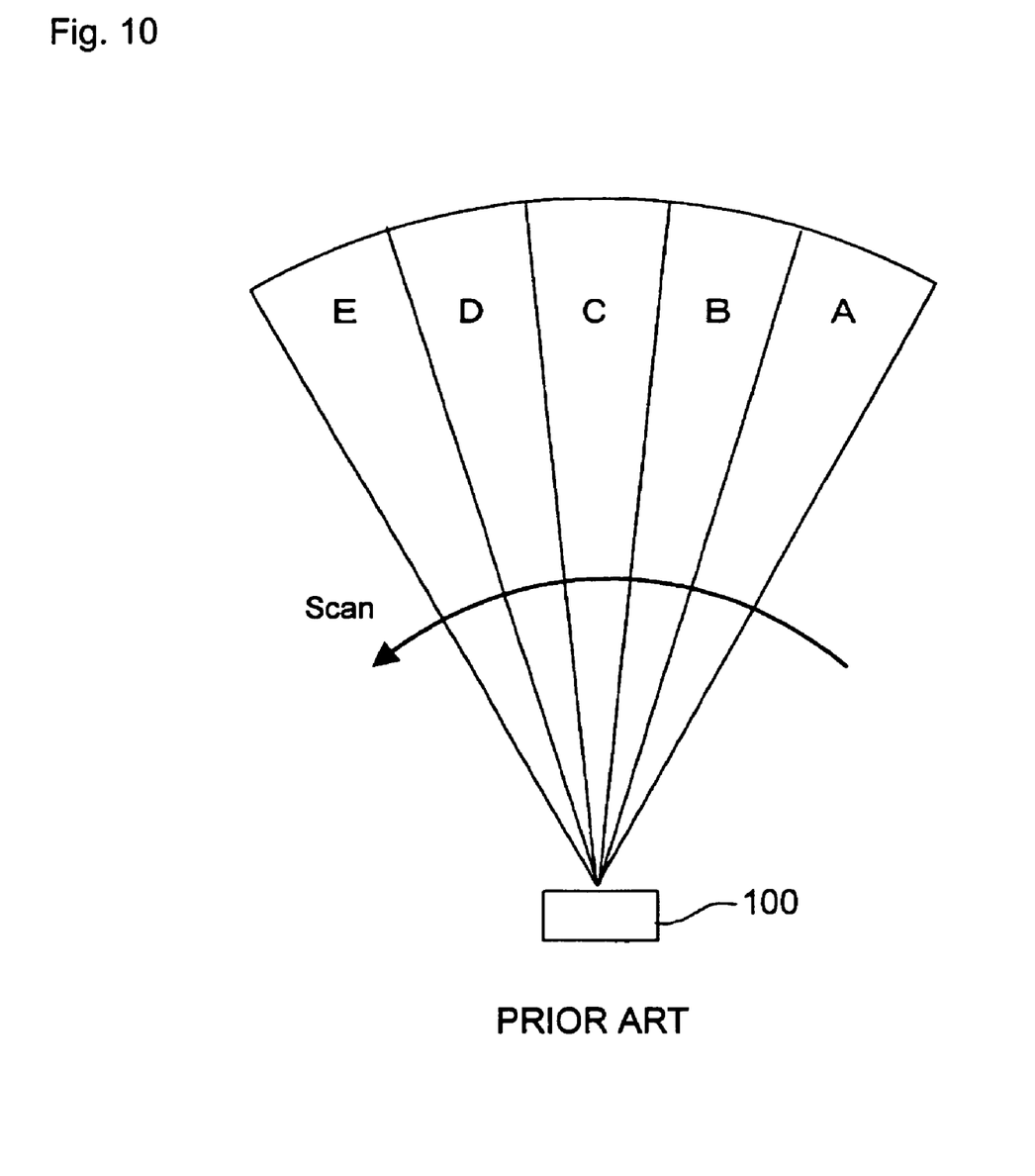
FIG. 10 is a view showing an example of an object detector using a conventional phased array antenna.

FIG. 10 shows an example of an object detector 100 using a phased array antenna. The phased array antenna comprises an array antenna having a plurality of arranged antenna elements, and a plurality of phase shifters each controlling a feeding phase to each antenna element. The phased array antenna can obtain a desired beam configuration by using a directional synthesis of each element, and can switch a beam direction electronically by differentiating a feeding phase every element.

According to the illustrated example, an antenna beam width (main lobe width) of about 10 degrees is implemented using eight antenna elements and beam scanning is performed in five directions every 10 degrees with 0 degree set at the front as a center thereof. In FIG. 10, regions designated by A to E are detection regions in the respective directional characteristics (beam directions).

When an object is detected, a feeding phase is set such that the beam direction is oriented to the detection region A first, and the electric wave is irradiated to the detection region A and its echo is observed. When the object exists in the detection region A, a power intensity of the echo (reception power intensity) becomes strong. Therefore, the existence of the object in the detection region A can be detected by determining whether the reception power intensity exceeds a predetermined threshold value or not. Similarly, the detection regions B to E are sequentially scanned, so that object detection can be performed within a range of 50 degrees.

According to this kind of object detector, since it is necessary to differentiate the detection object from another object and to specify an accurate bearing of the object, excellent directional characteristics is demanded as antenna characteristics. In addition, it is desirable to be able to finely vary the beam direction in order to improve bearing resolution.

Although the scanning is performed in five directions every 10 degrees with the beam width of 10 degrees in the above example, when the higher bearing resolution is required, the beam width is narrowed by increasing the number of antenna elements and scanning is performed in wide range of angles by setting the beam angle more finely.

When the number of antenna elements is increased in order to implement sharp directional characteristics, it becomes necessary to add a phase shifter or a circuit in accordance with that, which increases its cost. In addition, since an antenna area is increased, the detector itself is enlarged. According to the object detector for security or vehicle, since a compact detector is needed as much as possible in view of restriction of setting, the above problems are serious especially.

When the method of the JP Publication No. 08-105955 is employed, although the antenna area is not enlarged, two types of phase shifter circuits for transmission and reception are required and also phase shift value setting with high precision is required, causing the phase shifter circuit to be complicated. Therefore, practical application is difficult at a consumer level.

Furthermore, when the beam direction is controlled finely over wide angles, very high-performance phase shifter is required, and designing and manufacturing of the antenna or a line length become severe. Consequently, there are provided problems that the constitution becomes complicated, its yield is lowered, its cost is increased and the like. In addition, when the continuous scanning is implemented as in the JP Publication No. 07-106839 it is necessary to provide a compensation circuit or the like in order to prevent a characteristic change due to temperature variations of the phase shifter and the amplifier, and also the control with high precision is required, causing the constitution to be complicated and the cost to be increased.

SUMMARY OF THE INVENTION

The present invention was made in view of the above problems and it is an object of the present invention to provide technique which can improve bearing resolution with a simple constitution without causing an antenna to be enlarged and complicated and without increasing its cost.

In order to attain the above object, an object detector and an object detecting method are constituted as follows.

Control means scans a plurality of detection regions by switching a beam width and/or a beam direction of an antenna such that one of the detection regions overlap at least any one of the detection regions. Thus, when a detection object exists in the bearing where the detection regions overlap each other, an echo from the object in the plural detection regions is observed.

The "detection region" is a region determined by the beam width and the beam direction of the antenna and it means a range where the antenna can irradiate the electric wave and receive the echo reflected by the detection object. Aspects of "overlapping" of the detection regions comprises an aspect in which a part of one detection region overlaps a part of another detection region, an aspect in which a part of one detection region overlaps the whole of another detection region, and an aspect in which the whole of one detection region overlaps a part of another detection region.

When the echo in a certain detection region is received, it is determined whether the detection object exists in the detection region or not based on the received echo. Thus, concerning each scanned detection region, information whether the object exists or not can be obtained.

The above detecting operation is typically performed as follows. That is, when the detection object exists, reception power intensity of the echo received by the antenna becomes strong as compared with a case where the object does not exist. Thus, it is determined whether the object exists or not by determining whether the reception power intensity exceeds a given threshold value or not, using the above phenomenon.

After the detection results are obtained, the bearing where the detection object exists is narrowed down based on the detection results of the plural detection regions, by bearing specifying means. For example, when the object was detected in both detection regions 1 and 2, it can be narrowed down such that the object exists in a region corresponding to a product set of the two detection regions.

In other words, the bearing can be narrowed down in a range narrower than each detection region.

In addition, at this time, the bearing where the object exists may be narrowed down based on both detection result of the detection region where the object was detected, and the detection result of the detection region where the object was not detected. For example, in the above case, when the object was not detected in the detection region 3 which overlaps both of the detection regions 1 and 2, it can be narrowed down that the object exists in a region corresponding to a difference set in which the detection region 3 is excluded from the region corresponding to the product set of the detection regions 1 and 2. In other words, the bearing can be further narrowed down to smaller range by using both detection results.

The above bearing specifying operation may be typically performed as follows. That is, a region provided by excluding the region corresponding to a sum of sets of the detection regions where the object was not detected, from the region corresponding to the product set of the detection regions where the object was detected is specified as the bearing where the object exists. Thus, the bearing of the detection object can be specified by a unit of small region (range smaller than each detection region) divided by boundaries of the respective detection regions.

Furthermore, according to this operation, it is preferable that the information whether the object exists in the detection region or not is treated with logical values, and the region provided by excluding the region corresponding to the sum of sets of the detection regions where the object was not detected, from the region corresponding to the product set of the detection regions where the object was detected is calculated by logical operations. Thus, the processing cost can be extremely reduced and the bearing can be specified at high speed.

As an execution manner of the above described each operation, for example, there is a manner in which the bearing of the object is specified after the detection results concerning all of the predetermined plural detection regions are obtained. Since this manner is simple in logic, it can be implemented by a hardware (logic circuit).

In addition, there is another preferable manner in which scanning is repeated for a set of the detection regions by which all regions corresponding to the sum of sets of all of the detection regions can be scanned with the least number of scanning (normal scanning mode), and then, when the object is detected in either one of set of the detection regions, scanning of other detection regions required to narrow down the bearing where the object exists is started (refined scanning mode). According to this manner, since the number of scanning can be reduced, the object detection can be effectively performed at high speed.

Furthermore, there is still another preferable manner in which when one or more bearings of specifiable bearings are set by setting means as the bearings to be detected, only the detection regions required for narrowing down the set bearing to be detected are scanned. According to this manner, since only the bare minimum of range is scanned, the number of scanning is further reduced and more effective object detection can be performed.

As the antenna, two-way antenna which irradiates the electric wave to the detection region and receives its echo can be typically used and preferably a phased array antenna is used.

When the phase array antenna is used, the beam width may be switched by varying the number of the antenna elements to be fed, or the beam direction may be switched by controlling the feeding phase of the phase shifter. Thus, the plural detection regions can be scanned with simple constitution and control.

When the beam width is enlarged by reducing the antenna elements to be fed, the gain is relatively lowered. In this case, an amplifier is provided every antenna element and a feeding power to the antenna element is varied by the amplifier depending on the number of the antenna elements to be fed. Alternatively, an amplifier is provided at the pre-stage of the power distributor distributing a power to the plural antenna elements and the power supplied to the power distributor may be variable depending on the number of antenna elements to be fed. Thus, the antenna gain can be constant without depending on the number of the antenna elements to be fed, that is, the beam width.

According to the present invention described above, since the bearing of the detection object can be narrowed down to a range smaller than that of the detection region which is based on the directional characteristics of the antenna, the bearing resolution can be improved with the simple constitution without enhancing the directional characteristic of the antenna or controlling a variation amount of the beam direction finely, that is, without causing the antenna to be enlarged and complicated and without increasing its cost.

In addition, the present invention can be realized as the object detector or the object detecting method including at least one part of the above means and procedures, or a program for implementing these with a computer. Furthermore, the present invention can be constituted by combining the above means and procedures with each other as much as possible.

DESCRIPTION OF THE PREFERRED EMBODIMENTS

Hereinafter, preferred embodiments are illustratively described in detail with reference to the drawings. An object detector and an object detecting method according to the present invention can be appropriately used as an object detector such as a security sensor detecting an intruder or an intruding object, an in-car sensor detecting a forward car or an obstacle, a car sensor set at a parking lot or the like.

In addition, the present invention is not limited to dimensions, quality, configurations and its relative arrangement of components described in the following embodiments of the present invention as long as there is no specific description.

(First Embodiment)

Figure 1:
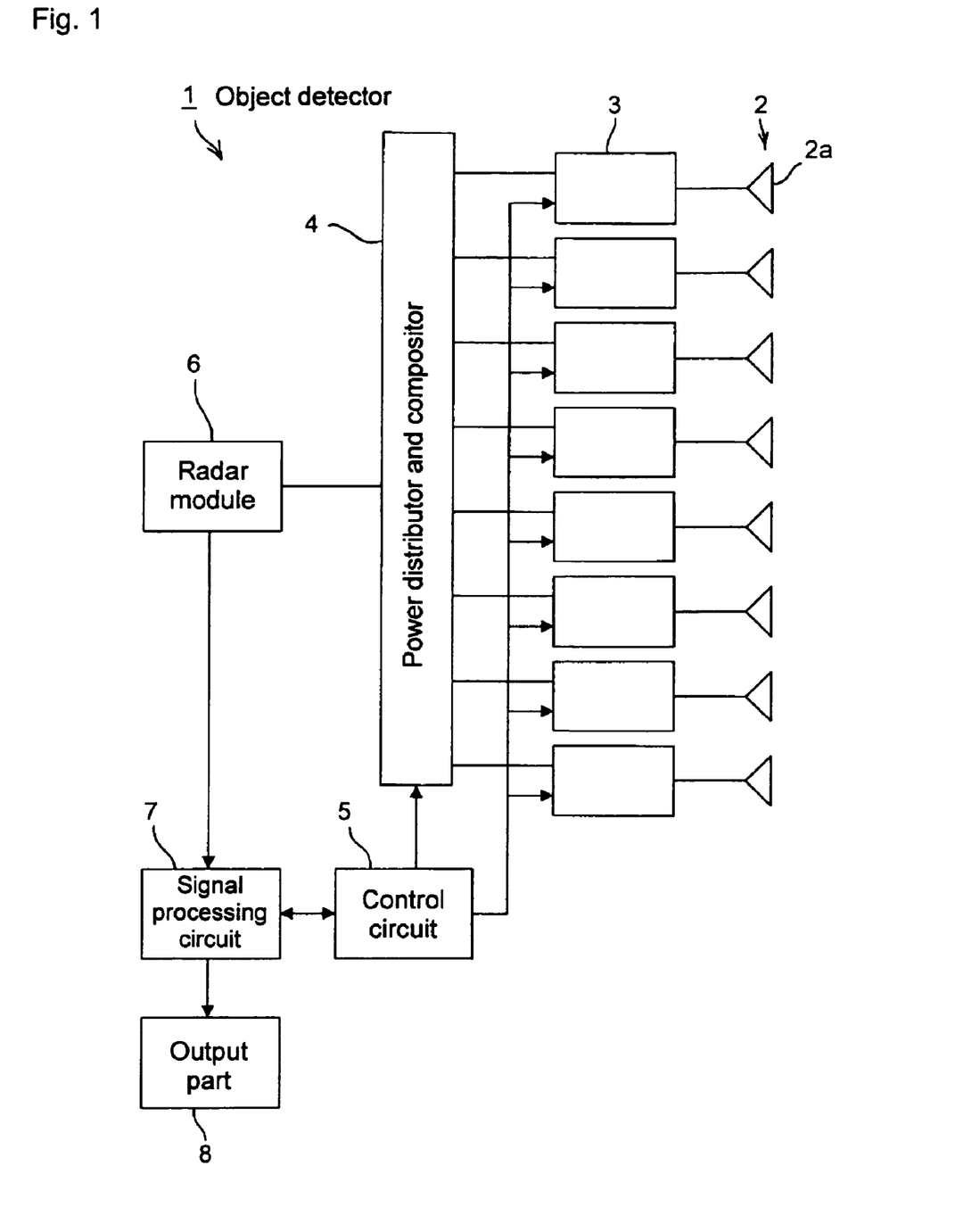
FIG. 1 is a block diagram showing a rough constitution of an object detector according to a first embodiment of the present invention.

FIG. 1 is a block diagram showing a rough constitution of an object detector according to a first embodiment of the present invention.

As shown in FIG. 1, the object detector 1 roughly comprises an array antenna 2, a phase shifter 3, a power distributor and compositor 4, a control circuit 5, a radar module 6, a signal processing circuit 7, and an output part 8. In addition, according to need, there may be provided an input part through which designation or setting is performed for the object detector 1, or a parameter is input. The above components may be incorporated into an apparatus with an integrated constitution or respective components or a part of them may be separately constituted.

The array antenna 2 consists of a plurality of antenna elements 2a. The array antenna 2 obtains a required beam configuration from directional synthesis of the plural antenna elements 2a. According to this embodiment, eight plane patch-type antenna elements about 4 mm square are arranged at intervals of about 9 mm, so that desired detection regions to be described later can be formed.

The digital phase shifter 3 for switching a feeding phase is connected to each antenna element 2a. The phase shifter 3 changes over a line length through a switch to make the feeding phase variable by stages every $n\pi/2m$ (n: integer of 0 or more and m: integer of 1 or more). According to this embodiment, the phase shifter 3 which can set four kinds of feeding phases such as 0, $\pi/4$, $2\pi/4$ and $3\pi/4$ is used.

The power distributor and compositor 4 has a function as a power distributor equivalently distributing a transmission power from the radar module 6 to each antenna element 2a, and a function as a power compositor compositing a reception power from each antenna element 2a. Each output end of the power distributor and compositor 4 is constituted so as to be switched and the output end on one side is connected to the phase shifter 3 and that on the other side is connected to a terminated resistance.

The control circuit 5 as controlling means is connected to each of the phase shifters 3 and the power distributor and compositor 4.

The control circuit 5 applies a control signal to the power distributor and compositor 4 to change over the switch on the output end, so that the number of antennas elements to be fed (the number of elements to be fed) is changed. As the number of the elements to be fed is increased, a beam width of the array antenna 2 becomes narrow as a whole. Meanwhile, as the number of the elements to be fed is decreased, the beam width is enlarged. According to this embodiment, the number of elements to be fed by the control circuit 5 is switched to 3 stages such as 8, 4 and 2, whereby the beam widths of about 10 degrees, 20 degrees and 40 degrees are provided, respectively.

In addition, the control circuit 5 applies the control signal to each phase shifter 3 to appropriately set the feeding phase of the phase shifter 3. Thus, abeam direction of the array antenna 2 as a whole can be switched. According to this embodiment, beam scanning is performed in three directions such as 0 degree at the front as a center thereof, +20 degrees and −20 degrees.

Figure 2:
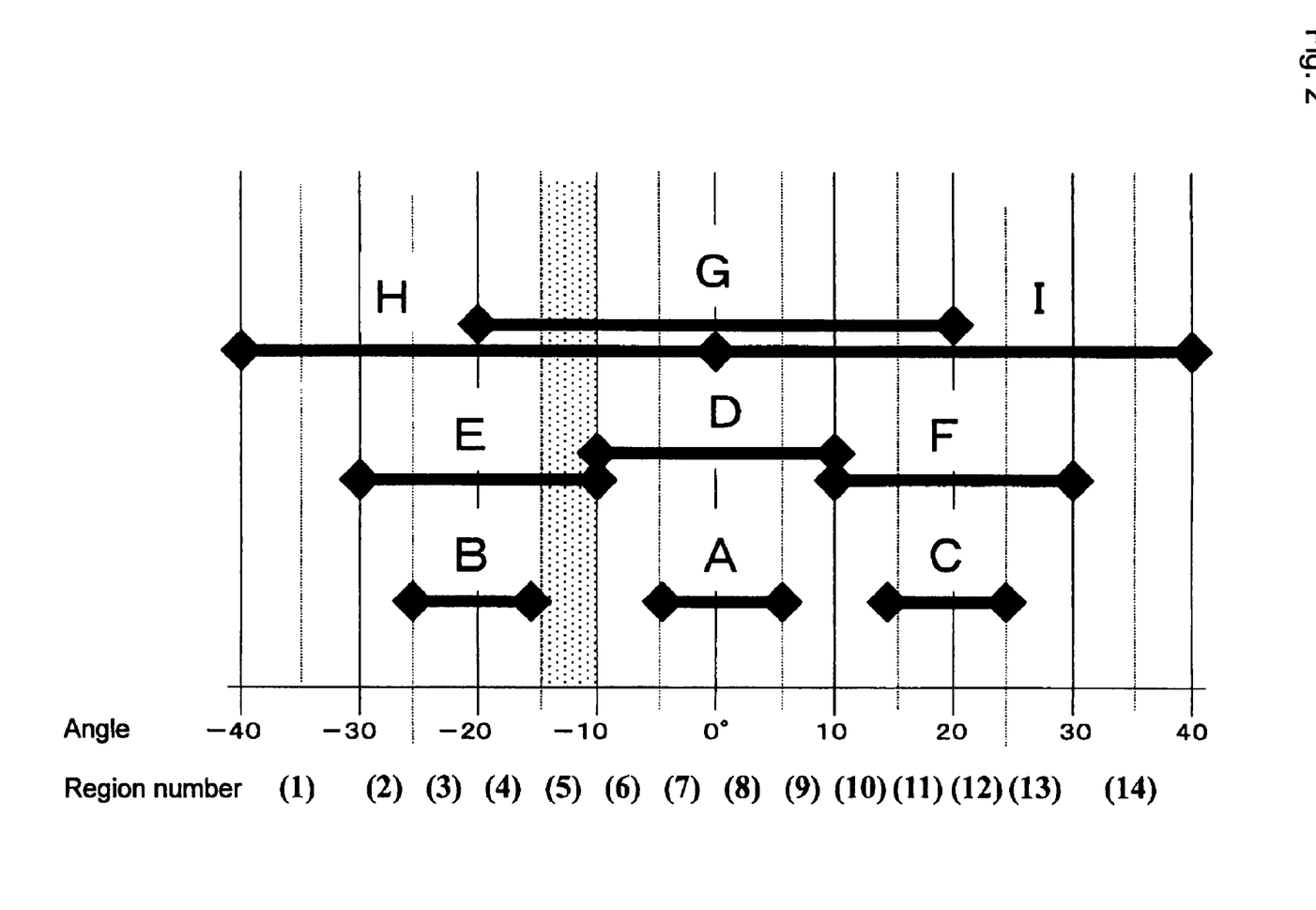
FIG. 2 is a view showing a frame format of a detection region.

FIG. 2 is a view showing a frame format of detection regions each determined by the beam width and the beam direction, in which an abscissa axis designates angles. The control circuit 5 changes over the beam width and/or the beam direction and nine detection regions designated by A to I can be scanned. Hereinafter, these detection regions formed directly by the beam of the array antenna 2 are referred to as "primary detection regions".

The primary detection region A is a region formed by directional characteristics of the beam direction of 0 degree/the beam width of 10 degrees and ranges over −5 degrees to +5 degrees. The primary detection region B is a region formed by directional characteristics of the beam direction of −20 degrees/the beam width of 10 degrees and ranges over −25 degrees to −15 degrees. The primary detection region C is a region formed by directional characteristics of the beam direction of +20 degrees/the beam width of 10 degrees and ranges over +15 degrees to +25 degrees. The primary detection region D is a region formed by directional characteristics of the beam direction of 0 degree/the beam width of 20 degrees and ranges over −10 degrees to +10 degrees. The primary detection region E is a region formed by directional characteristics of the beam direction of −20 degrees/the beam width of 20 degrees and ranges over −30 degrees to −10 degrees. The primary detection region F is a region formed by directional characteristics of the beam direction of +20 degrees/the beam width of 20 degrees and ranges over +10 degrees to +30 degrees. The primary detection region G is formed by directional characteristics of the beam direction of 0 degree/the beam width of 40 degrees and ranges over −20 degrees to +20 degrees. The primary detection region H is a region formed by directional characteristics of the beam direction of −20 degrees/the beam width of 40 degrees and ranges over −40 degrees to 0 degree. The primary detection region I is a region formed by directional characteristics of the beam direction of +20 degree/the beam width of 40 degrees and ranges over 0 degree to +40 degrees.

The primary detection regions A, D, G, Hand I overlap each other. Similarly, the primary detection regions B, E, G and H overlap each other, and the primary detection regions C, F, G and I overlap each other. In other words, the plural primary detection regions A to I are formed such that any one of them overlaps at least another detection region.

Focusing on the overlaps of the primary detection regions, the whole detection range (−40 degrees to +40 degrees as the whole region corresponding to a sum of sets of the primary detection regions A to I) can be considered that it is divided into 14 small regions designated by (1) to (14) in the drawing. Hereinafter, these small regions are referred to as secondary detection regions.

The secondary region (1) is constituted by the primary detection region H only and its range is over −40 degrees to −30 degrees. The secondary detection region (2) is a region where only the primary detection regions H and E overlap each other and its range is over −30 degrees to −25 degrees. The secondary detection region (3) is a region where only the primary detection regions H, E and B overlap each other and its range is over −25 degrees to −20 degrees. The secondary detection region (4) is a region where only the primary detection regions G, H, E and B overlap each other and its range is over −20 degrees to −15 degrees. The secondary detection region (5) is a region where only the primary detection regions G, H and E overlap each other and its range is over −15 degrees to −10 degrees. The secondary detection region (6) is a region where only the primary detection regions G, H and D overlap each other and its range is over −10 degrees to −5 degrees. The secondary detection region (7) is a region where only the primary detection regions G, H, D and A overlap each other and its range is over −5 degrees to 0 degrees. The secondary detection region (8) is a region where only the primary detection regions G, I, D and A overlap each other and its range is over 0 degree to 5 degrees. The secondary detection region (9) is a region where only the primary detection regions G, I and D overlap each other and its range is over 5 degrees to 10 degrees. The secondary detection region (10) is a region where only the primary detection regions G, I and F overlap each other and its range is over 10 degrees to 15 degrees. The secondary detection region (11) is a region where only the primary detection regions G, I, F and C overlap each other and its range is over 15 degrees to 20 degrees. The secondary detection region (12) is a region where only the primary detection regions I, F and C overlap each other and its range is over 20 degrees to 25 degrees. The secondary detection region (13) is a region where only the primary detection regions I and F overlap each other and its range is over 25 degrees to 30 degrees. The secondary detection region (14) is a region constituted by the primary detection region I only and its range is over 30 degrees to 40 degrees.

Thus, each of the secondary detection regions (1) to (14) can be recognized as one or a combination (overlap) of two or more primary detection regions and it is a unit sectioned by boundaries of the respective primary detection regions. Therefore, the secondary detection region has a width surely narrower than that of the primary detection region.

Therefore, when respective echoes are obtained by scanning the predetermined plural primary detection regions, the bearing of the detection object can be narrowed down to a range of the secondary detection region which is narrower than the primary detection region, based on the combination of the primary detection regions where the object was detected. The object detector 1 according to this embodiment detects the object based on this principle.

In addition, a formation manner of the primary and secondary detection regions is not limited to that shown in FIG. 2 and it may be appropriately modified so as to implement a required detection range as needed. For example, when the setting of the beam width or the beam direction is changed, or the number of stages for switching is increased or decreased, various aspects of primary and secondary detection regions can be formed. Furthermore, it is also possible to determine the secondary detection regions first, and to control the beam width and/or the beam direction so as to obtain the combination of the primary detection regions such that the secondary detection regions are formed.

The radar module 6 has a function of generating a transmission signal which is to be irradiated from the array antenna 2 and supplying it to the power distributor and compositor 4, and a function of receiving a reception signal (echo) received by the array antenna 2 through the power distributor and compositor 4 and outputting a beat signal provided by mixing the transmission signal and the reception signal, to the signal processing circuit 7.

As a radar method, there are a pulse radar method of using a pulse wave as an electric wave irradiated from the antenna, and a continuous wave radar method of using a frequency modulation wave as it. Furthermore, as a modulation method, there are frequency modulation (FM), amplitude modulation (AM), pulse amplitude modulation (PAM) and the like. Any method can be employed in this embodiment and a frequency band of the electric wave to be used is not specifically limited.

The signal processing circuit 7 is signal processing means for processing a given operation for the beat signal input from the radar module 6, which has functions as detecting means for detecting whether there is a detection object in the primary detection region or not based on the received echo, and bearing specifying means for narrowing down the bearing in which the object exists based on the detection results of the plural primary detection regions. In addition, if necessary, it outputs an order to the control circuit 5 in some cases.

The signal processing circuit 7 comprises a computer provided with a CPU, a ROM, a RAM and the like as a basic hardware. The above functions are implemented by reading a program stored in the ROM and carrying it out during the operation.

The output part 8 is output means for outputting the result of the object detecting operation. For example, as the output means, there can be considered means for lighting lamps of the bearing where the object was detected, which lamps are provided so as to correspond to the secondary detection regions (1) to (14), displaying means such as a liquid crystal panel, for displaying the bearing where the object was detected, warning means for generating a warning sound when the object was detected in any bearing, and means for outputting the detection result to other external devices as a signal. In addition, the primary detection region which is under the scanning operation at the present can be output to the output part 8.

Figure 3:
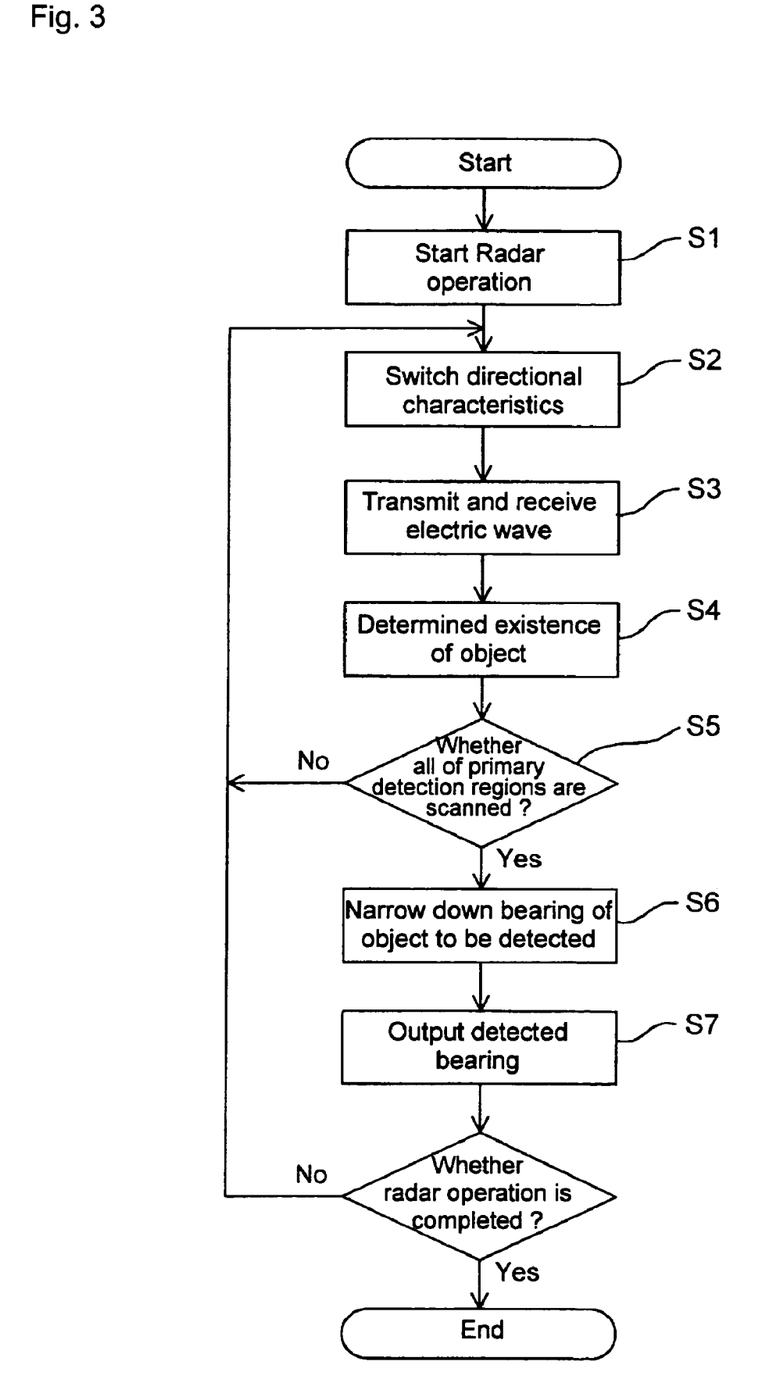
FIG. 3 is a flowchart of an object detecting operation according to the first embodiment of the present invention.

Then, an object detecting operation in the above object detector 1 is described in detail with reference to a flowchart shown in FIG. 3. A case where there is an object in the bearing of the secondary detection region (5) is taken as an example here.

When the object detector 1 starts to operate, at step S1, a radar operation is started and the above each part is initialized.

At step S2, the control circuit 5 transmits control signals to the phase shifter 3 and the power distributor and compositor 4 to change over the beam width and the beam direction of the array antenna 2. According to this embodiment, since the primary detection regions are scanned in the order of I→G→H→F→D→E→C→A→B, the directional characteristics are set so as to form the primary detection region I first. More specifically, the number of the antenna elements 2a to be fed is set at 2, the beam width is set at 40 degrees and the beam direction is set at +20 degrees.

At step S3, the electric wave is irradiated from the array antenna 2 toward the primary detection region and its echo is received.

At step S4, the best signal is generated from the transmission signal and the reception signal by the radar module 6 and output to the signal processing circuit 7. The signal processing circuit 7 performs A/D conversion to the beat signal and performs FFT (Fast Fourier Transform) to it to obtain reception power intensity data. When the object exists in the relevant primary detection region, the reception power intensity is higher than that when it does not exist. The signal processing circuit 7 determines whether the object exists or not by determining that the reception power intensity exceeds a given threshold value or not.

At step S5, it is determined whether scanning of the all predetermined nine primary detection regions are finished or not. When it is not, the operation returns to step S2 and the directional characteristics of the array antenna 2 is switched to the next setting. Then, the operations at steps S3 and S4 are repeated.

Thus, the beam scanning is performed for the primary detection regions A to I sequentially, and then, information (detection result) whether the object exists or not referring to each primary detection region can be obtained. The detection result is temporarily stored in storing means such as RAM or the like in the form of logical values. In this example, the number "1" designating that the object was detected is stored referring to the primary detection regions E, G and H and the value "0" designating that the object was not detected is stored referring to other primary detection regions.

At step S6, the bearing in which the object exists is narrowed down based on the detection results of the plural primary detection regions. The signal processing circuit 7 performs an operation for assigning the detection results read from the storing means to logical operation expressions.

Figure 4A:
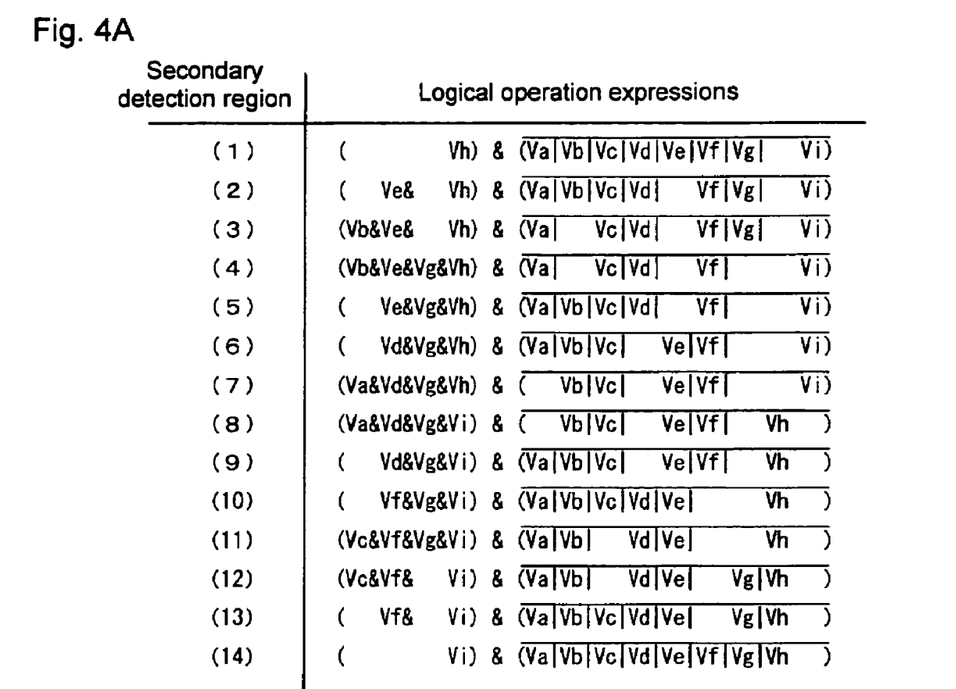
FIG. 4 is an explanatory drawing showing an example of logical operation expressions.

An example of the logical operation expressions is shown in FIG. 4A, in which reference character Vx designates a detection result (logical value) of the primary detection region X, reference sign & designates an AND operator and reference sign | designates an OR operator. When the operation result obtained by assigning the detection results of the primary detection regions A to I to each logical operation expression is "1", it can be specified that the object exists in the relevant secondary detection region. In this example, since Ve, Vg and Vh are "1" and others are "0", only the fifth expression is "1" and it can be understood that the object exists in the bearing of the secondary detection region (5). Thus, since the bearing specifying operation is performed by the logical operations in this embodiment, the processing cost can be extremely lowered and the bearing can be specified at high speed.

The above logical operation expression corresponds to the operation which determines a region provided by excluding the region corresponding to the sum of sets of the primary detection regions (A, B, C, D, F and I) where the object was not detected, from the region corresponding to the product set of the primary detection regions (E, G and H) where the object was detected, as the bearing where the object exists, using both the detection result of the primary detection regions in which the object was detected and the detection result of the primary detection region in which the object was not detected. Thus, the bearing of the object can be specified by the unit of the secondary detection region which is narrower than the primary detection region.

Figure 4B:
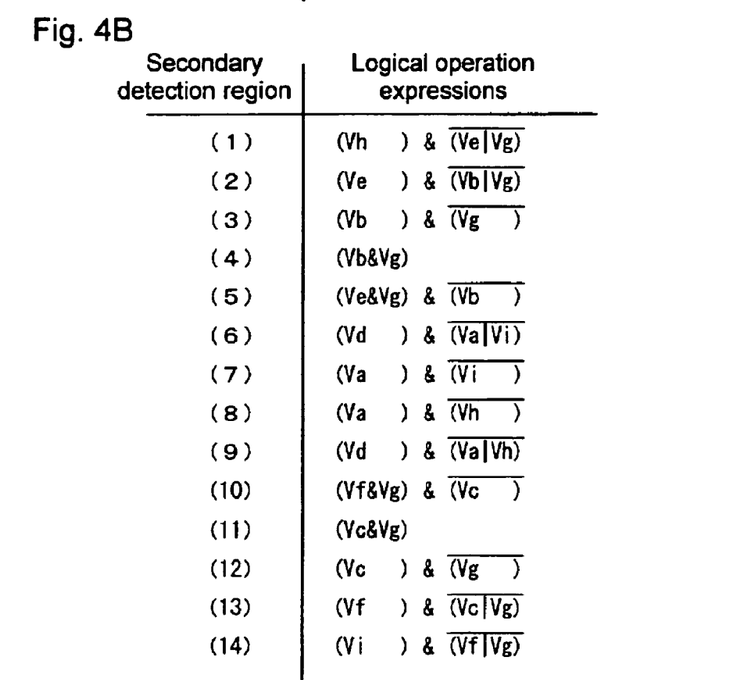

In addition, the logical operation expressions shown in FIG. 4A includes a redundant part (logical operation which is not necessary). Simple logical operation expressions excluding the redundant part are shown in FIG. 4B. The logical operation expressions corresponds to the operations in which a region provided by excluding a second region corresponding to the sum of sets of the (B) which is not included in other primary detection regions and overlaps the first region among the plural primary detection regions (A, B, C, D, F and I) where the object was not detected, from the first region corresponding to the product set of the primary detection regions (E and G) excluding (H) which includes other primary detection region (E) among the plural primary detection regions (E, G and H) where the object was detected is determined as the bearing where the object exists. Thus, the bearing can be specified further simply at higher speed.

At step S7, the bearing where the object was detected is output to the output part 8. Then, it notifies the user of the existence of the object.

As described above, according to this embodiment, bearing resolution every 5 degrees can be implemented, using the array antenna 2 having the minimum beam width of 10 degrees. In addition, fourteen directions can be specified over a wide range of −40 degrees to +40 degrees, using the phase shifter 3 capable of switching the beam to the three directions. In other words, the bearing resolution and the number of scanning steps are increased by two-fold and about five-fold, respectively without changing the constitution of the antenna or the phase shifter, as compared with the conventional method.

Furthermore, in order to implement the similar detecting operation by the conventional method, it is necessary to switch the beam directions to fourteen stages every 5 degrees, using the antenna having the beam width of 5 degrees. However, when the beam width is reduced, the number of antenna elements is increased, causing an antenna area to be enlarged, and when the number of the scanning steps is increased, the phase shifter becomes advanced and complicated, which increases the cost.

In this respect, according to this embodiment, the bearing resolution can be improved with the simple constitution and control, without enlarging and complicating the antenna, and without increasing the cost thereof.

In addition, although the bearing specifying operation is implemented by the software program in this embodiment, it may be implemented by a hardware (logical circuit) implementing the logic by the logic operation expressions shown in FIG. 4.

(Second Embodiment)

Figure 5:
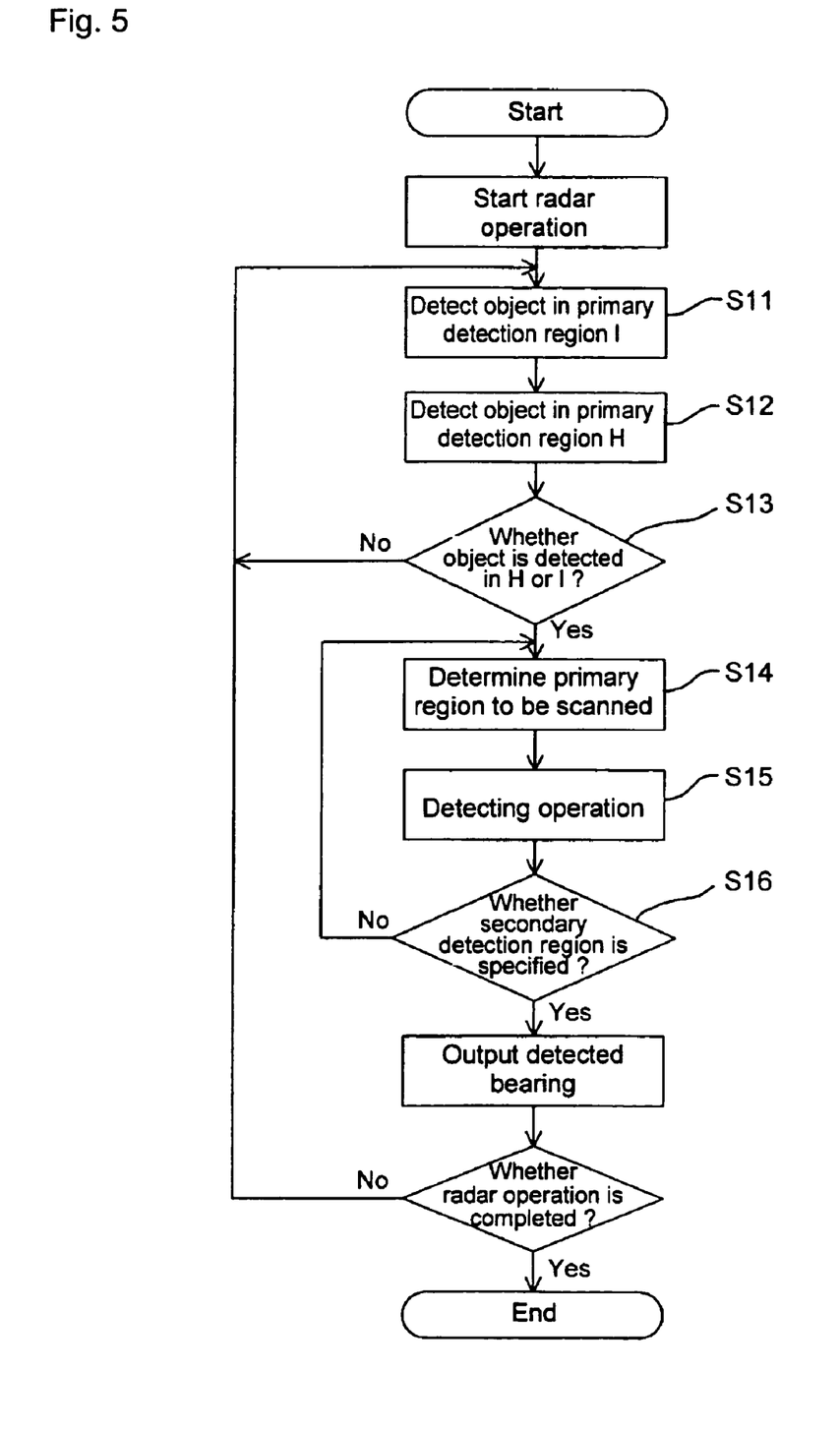
FIG. 5 is a flowchart of an object detecting operation according to a second embodiment of the present invention.

A second embodiment of the present invention is described with reference to a flowchart shown in FIG. 5. Since the aspects of the apparatus constitution of an object detector 1 and primary and secondary detection regions are the same as the first embodiment, their detailed description is omitted here.

Although the bearing where the object exists is specified after the detection results referring to all of the predetermined nine primary detection regions A to I are obtained in the first embodiment, according to this embodiment, scanning is repeated only for a set of the primary detection regions (H and I) by which the whole detection range can be scanned by the least number of scanning among the predetermined nine primary detection regions A to I (normal scanning mode), and then, when the object was detected in the primary detection region H or I, scanning is started for the other primary detection regions (A to G) required for narrowing down the bearing where the object exists (refined scanning mode).

At step S11, a control circuit 5 transmits a control signal to a phase shifter 3 and a power distributor and compositor 4 to set directional characteristics so as to form the primary detection region I. Then, an electric wave is irradiated from an array antenna 2 toward the primary detection region I and its echo is received. Then, the same detecting operation as that of the first embodiment is performed to determine whether the object exists in the primary detection region I or not.

At step S12, the directional characteristics are set such that the control circuit 5 forms the primary detection region H. Then, the same operation is performed to determine whether the object exists in the primary detection region H or not.

At step S13, it is determined whether the object was detected in the primary detection region H or I, or not. When the object was not detected, the operation returns to step S11 and the operations at steps S 11 to 13 are repeated. This is the normal scanning mode.

At step S13, when it is determined that the object was detected in the primary detection region H or I, the refined scanning mode after step S14 is performed.

Figure 6:
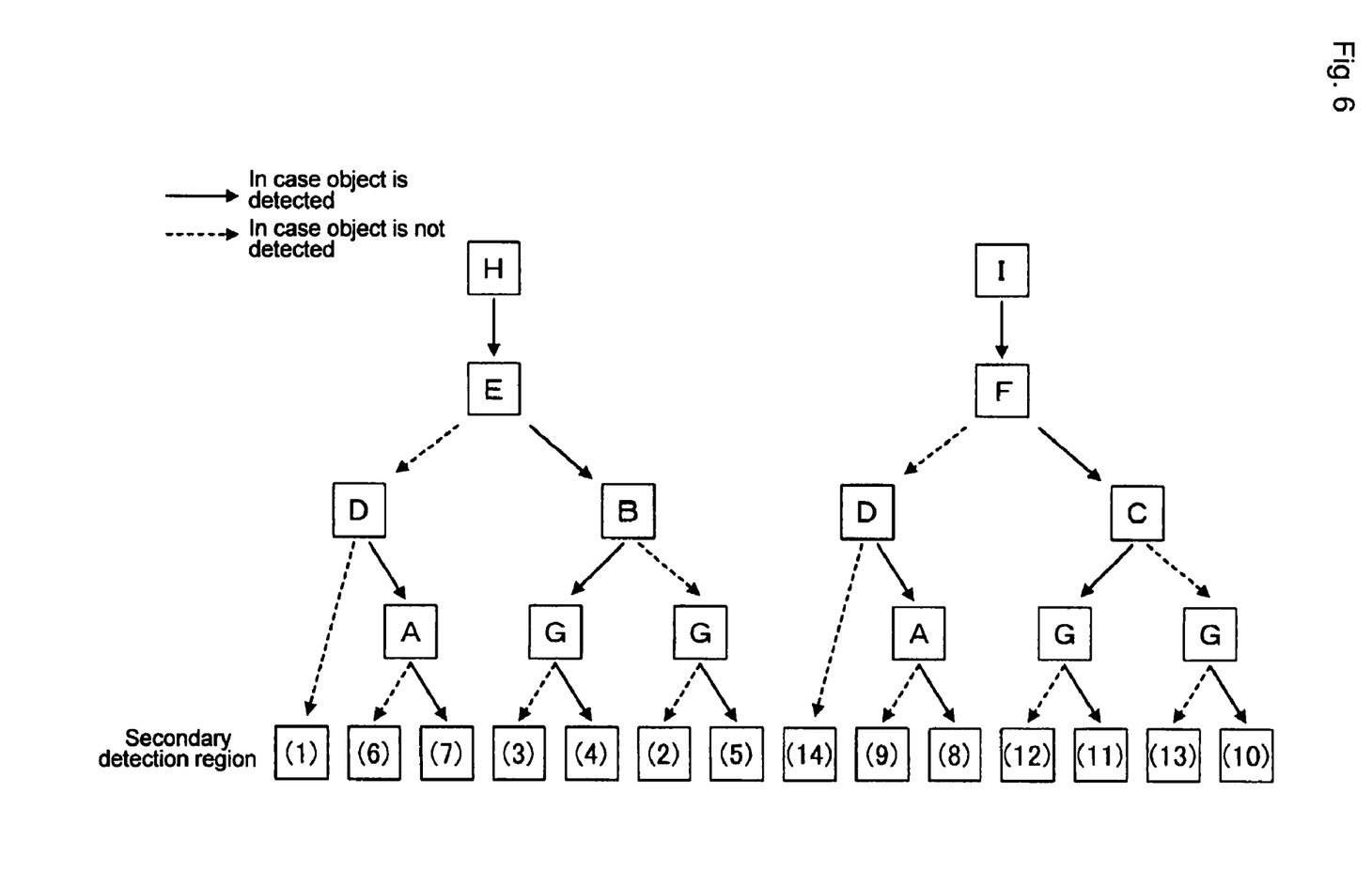
FIG. 6 is an explanatory drawing showing a setting order of primary detection regions in a refined operation mode.

At step S14, the primary detection region to be scanned next is determined to narrow down the bearing. FIG. 6 is a block diagram showing setting orders of the primary detection regions in the refined scanning mode. Arrows of solid lines designate the primary detection region to be scanned next when the object was detected, and arrows of dotted lines designate the primary detection region to be scanned next when the object was not detected. For example, when the object was detected at the primary detection region H, the primary detection region E is set next. When the object was detected at the primary detection region E, the primary detection region B is set next. Alternatively, when the object was not detected, the primary detection region D is set next.

At step S15, the directional characteristics are set so as to form the primary detection region determined at step S14. Then, the same detecting operation as above is performed to determine whether the object exists in the relevant primary detection region or not.

At step S16, it is determined whether the secondary detection region can be specified according to the detection result at step S15 or not. More specifically, as shown in FIG. 6, when the detection result of the primary detection region A or G was obtained, or when the detection result of the primary detection region D was not detected, the secondary detection region can be specified. In a case other than that, since it is necessary to further narrow it down, the operation returns to step S14.

Since the bearing of the object can be narrowed down to the range of the secondary detection region according to this embodiment described above, the same effect can be provided as that of the first embodiment. Furthermore, since the number of scanning can be reduced as compared with the first embodiment, the object can be detected effectively at higher speed.

In addition, the narrowing operation performed in this embodiment is equivalent to the operation of any one of expression among the logical operation expressions shown in FIG. 4B and it is nothing but the operation in which a region provided by excluding a region corresponding to sum of sets of the primary detection regions where the object was not detected, from the region corresponding to the product set of the primary detection regions where the object was detected, is specified as the bearing where the object exists.

(Third Embodiment)

Figure 7:
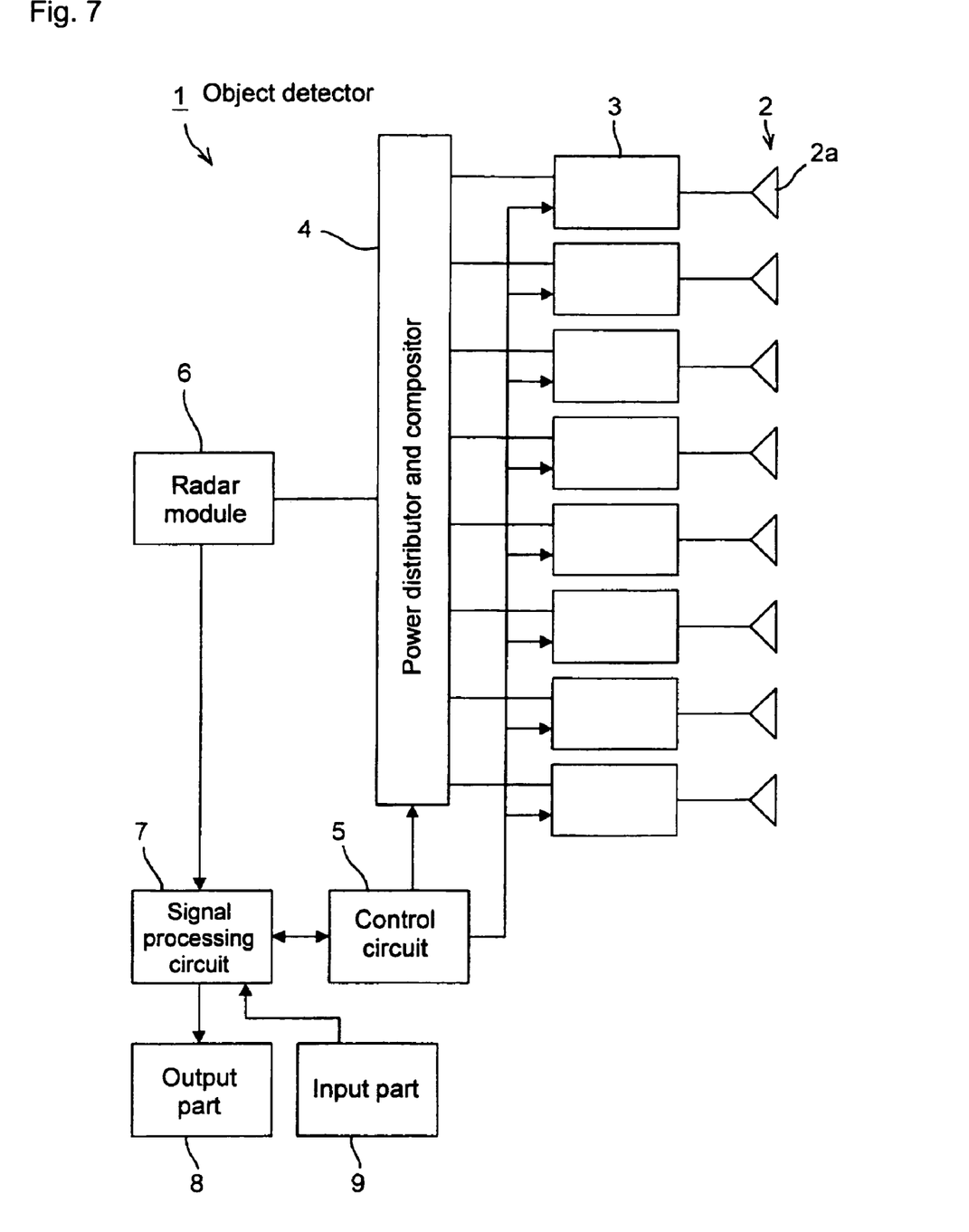
FIG. 7 is a block diagram showing a rough constitution of an object detector according to a third embodiment of the present invention.

A third embodiment of the present invention is describe with reference to FIG. 7.

As shown in FIG. 7, an object detector 1 according to this embodiment comprises an input part 9 as setting means which can set one or more bearing among the secondary detection regions (1) to (14) which can be specified by the bearing specifying operation, as the bearing to be detected.

In addition, since the aspects of the other apparatus constitution and primary and secondary detection regions are the same as that of the first and second embodiments, detailed description thereof is omitted here.

For example, in the input part 9, when four bearings of the secondary detection regions (2) to (5) are set as the bearings to be detected, as can be seen from FIG. 6, when four primary detection regions H, E, B and G are scanned among the predetermined nine primary detection regions, it is possible to narrow down whether the object exits in either one of the bearings to be detected or not.

Therefore, as in the first embodiment, when respective detection results are substituted for the logical operation expressions shown in FIG. 4B after the primary detection regions H, E, B and G are scanned, the object detecting operation can be performed. Alternatively, as in the second embodiment, the primary detection region H is observed as the normal scanning mode and when the object was detected in the region, the refined scanning mode is carried out in the order of E→B→G, so that the object detecting operation can be performed.

Thus, according to this embodiment, since the same effects as in the first and second embodiments can be provided and scanning is only performed within bare essentials of range, the number of scanning can be further reduced and more effective object detecting can be performed.

(Fourth Embodiment)

Figure 8:
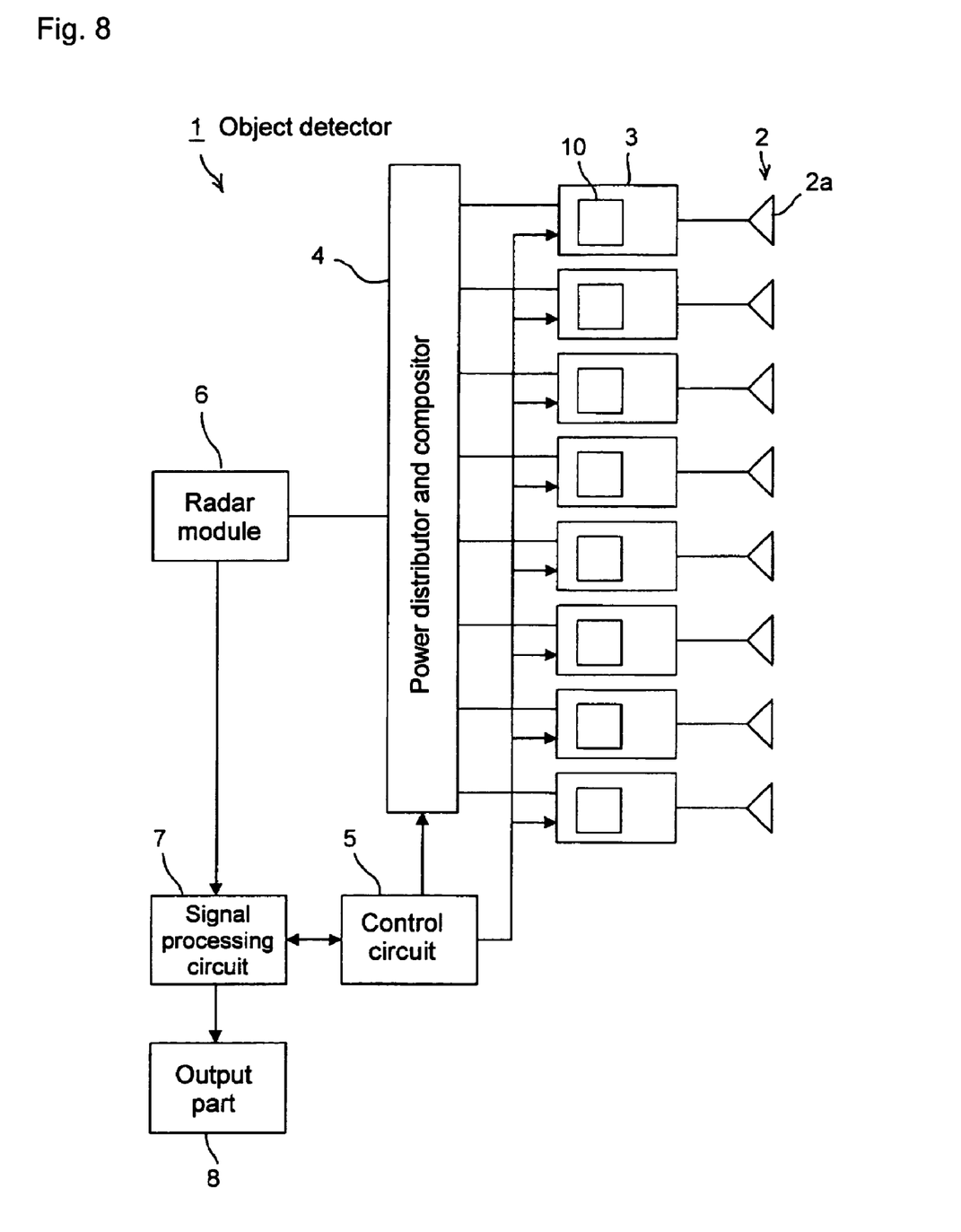
FIG. 8 is a block diagram showing a rough constitution of an object detector according to a fourth embodiment of the present invention.

A fourth embodiment of the present invention is described with reference to FIG. 8.

In addition, detailed description of the same parts as in the first, second and third embodiments is omitted here and a different part is mainly described.

As described above, the object detector 1 performs an operation for reducing the number of elements to be fed in order to enlarge the beam width of the array antenna 2. However, when the number of the elements is reduced, a power irradiated from the array antenna 2 in total is reduced depending on the reduced number of the elements, causing a gain to be lowered as the whole of the antenna. As a result, a limit distance (distance from the antenna) at which the object can be detected is different from the other when the beam width is large and when the beam width is narrow.

Then, according to this embodiment, an amplifier 10 is provided every antenna element 2a and a feeding power to the antenna element 2a is varied by the amplifier 10 depending on the number of the elements to be fed. In addition, the amplifier 10 is disposed inside of the phase shifter 3.

A control circuit 5 controls an amplification factor of the amplifier 10 depending on the beam width (the number of elements to be fed) such that the antenna gain becomes constant, that is, the limit distances at which the object can be detected become the same when the beam width is wide and when it is narrow. Thus, preferable object detecting can be performed.

In addition, although a line length of each antenna element 2a is varied in some cases because of a manufacturing error or the like, the beam configuration of the array antenna 2 can be finely adjusted by appropriately adjusting the amplification factor of the amplifier 10 every antenna element. Thus, the primary detection regions can be strictly formed and the reliability of the object detection can be improved.

(Fifth Embodiment)

Figure 9:
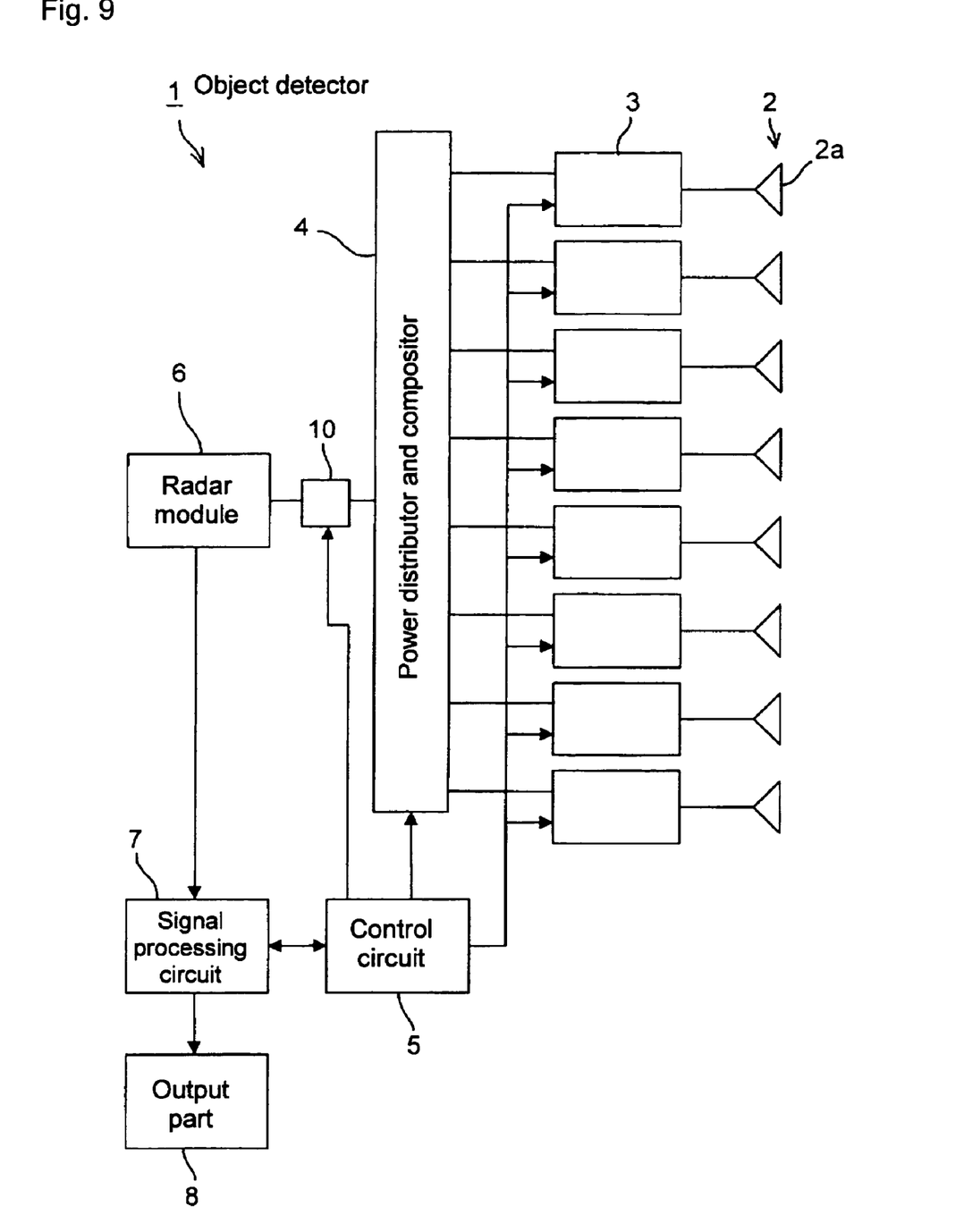
FIG. 9 is a block diagram showing a rough constitution of an object detector according to a fifth embodiment of the present invention.

A fifth embodiment of the present invention is described with reference to FIG. 9.

In addition, detailed description of the same parts as in the first, second and third embodiments is omitted and different part is described mainly here.

According to the fourth embodiment, although the plural amplifiers are provided for antenna elements, the control of every amplifier becomes complicated a little in this case.

Then, according to this embodiment, an amplifier 10 is provide at a pre-stage of a power distributor and compositor 4 and a power of a transmission signal supplied from a radar module 6 to the power distributor and compositor 4 is made variable depending on the number of elements to be fed.

A control circuit 5 controls an amplification factor of an amplifier 10 depending on the beam width (the number of elements to be fed) to make the antenna gain constant, that is, to make the limit distances at which the object can be detected the same when the beam width is wide and when it is narrow.

As described above, according to the present invention, the bearing resolution can be improved with the simple constitution without causing the antenna to be enlarged and complicated and without increasing its cost.

What is claimed is:

1. An object detector comprising:
    an antenna irradiating an electric wave to a first detection region and receiving its echo;
    control means for switching a beam width and/or a beam direction of the antenna and scanning a plurality of additional detection regions such that one of the detection regions overlaps at least another one of other detection regions;
    detecting means for detecting whether a detection object exists in each of the detection regions based on the received echo; and
    bearing specifying means for narrowing down a bearing in which the detection object exists based on detection results of the first and additional detection regions.

2. The object detector according to claim 1, wherein the bearing specifying means narrows down the bearing in which the detection object exists based on both detection results of the detection regions where the object was detected, and the detection results of the detection regions in which the object was not detected.

3. The object detector according to claim 2, wherein the bearing specifying means specifies a region provided by excluding a region corresponding to sum of sets of the detection regions where the object was not detected, from a region corresponding to product set of the detection regions where the object was detected, as a bearing in which the object exists.

4. The object detector according to claim 3, wherein the bearing specifying means assigns, for each detection region, a logical value based on information identifying whether the detection object exists in the direction region, and calculates the bearing by excluding the detection regions where the object was not detected, from the detection regions where the object was detected using logical operations upon the logical values.

5. The object detector according to claim 1, wherein the bearing specifying means specifies the bearing in which the object exists, after detection results are obtained for the detection regions.

6. The object detector according to claim 1, wherein when the object is detected in one of the detection regions, the control means causes the object detector to scan those other detection regions needed to narrow down the bearing.

7. The object detector according to claim 1, further comprising:
    setting means which can set one or more bearings of bearings which can be specified by the bearing specifying means, as a bearing to be detected;
    wherein setting means operates the control means to cause the object detector to scan only the detection regions required for narrowing down the bearing.

8. The object detector according to claim 1, wherein the antenna is a phased array antenna comprising:
    a plurality of antenna elements and phase shifters;
    wherein control means switches a beam width by varying the number of antenna elements being fed, or switching a beam direction by controlling a feeding phase of the phase shifter.

9. The object detector according to claim 8, comprising:
    an amplifier respectively provided for each antenna element for varying a feeding power to the respective antenna elements based on the number of the antenna elements being fed.

10. The object detector according to claim 8, further comprising:
    a power distributor for distributing a power to the plural antenna elements; and
    an amplifier varying a power to be supplied to the power distributor depending on the number of antenna elements to be fed.

11. An object detecting method of detecting an object with an antenna irradiating an electric wave to a detection region and receiving its echo comprising:
    a step of switching a beam width and/or a beam direction of the antenna and scanning a plurality of detection regions such that one of the detection regions overlaps at least another one of the plurality of detection regions;
    a step of detecting whether a detection object exists in each one of the detection regions based on the received echo; and
    a step of narrowing down a bearing in which the detection object exists based on detection results of the plural detection regions.

12. The object detecting method according to claim 11, further comprising:
    a step of narrowing down a bearing in which the detection object exists based on both detection results of the detection regions where the object was detected, and the detection results of the detection regions in which the object was not detected.

13. The object detecting method according to claim 12, further comprising:
    a step of specifying a region provided by excluding a region corresponding to sum of sets of the detection regions where the object was not detected, from a region corresponding to product set of the detection regions where the object was detected, as a bearing in which the detection object exists.

14. The object detecting method according to claim 13, further comprising:
    a step of assigning a logical value based on whether the detection object exists in the detection region; and
    calculating the bearing provided by excluding the region corresponding to the sum of sets of the detection region where the object was not detected, from the region corresponding to the product set of the detection regions where the object was detected, using logical operations.

15. The object detecting method according to claim 11, further comprising:
    a step of specifying the bearing in which the object exists, after detection results are obtained from the detection regions.

16. The object detecting method according to claim 11, further comprising:
    a step of repeating scanning for a set of detection regions by which the whole regions corresponding to the sum of sets of all detection regions can be scanned with the least number of scanning, among the detection regions; and when the object is detected, starting scanning for the other detection regions required for narrowing down the baring in which the object exists.

17. The object detecting method according to claim 11, wherein said step of scanning only scans the detection regions required for narrowing down the bearing to be detected among the detection regions.

* * * * *